United States Patent
Min

(10) Patent No.: US 11,897,560 B2
(45) Date of Patent: Feb. 13, 2024

(54) ROAD SURFACE IMPACT STIMULATION DEVICE OF STEER-BY-WIRE SYSTEM

(71) Applicant: HL MANDO CORPORATION, Gyeonggi-do (KR)

(72) Inventor: Seung Gi Min, Seoul (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 133 days.

(21) Appl. No.: 17/617,924

(22) PCT Filed: Jun. 4, 2020

(86) PCT No.: PCT/KR2020/007251
§ 371 (c)(1),
(2) Date: Dec. 9, 2021

(87) PCT Pub. No.: WO2020/251213
PCT Pub. Date: Dec. 17, 2020

(65) Prior Publication Data
US 2022/0306188 A1    Sep. 29, 2022

(30) Foreign Application Priority Data
Jun. 10, 2019  (KR) .......... 10-2019-0067882

(51) Int. Cl.
*B62D 6/00* (2006.01)
*B62D 5/04* (2006.01)

(52) U.S. Cl.
CPC .......... *B62D 6/008* (2013.01); *B62D 5/0481* (2013.01)

(58) Field of Classification Search
CPC .............................. B62D 6/008; B62D 5/0481
See application file for complete search history.

(56) References Cited

U.S. PATENT DOCUMENTS 5,742,918 A * 4/1998 Ashrafi ................. B60T 8/172
                                                            303/146
6,389,342 B1 * 5/2002 Kanda ................... B62D 6/008
                                                            180/443
(Continued)

FOREIGN PATENT DOCUMENTS

JP        2013-075614        4/2013
KR    10-2018-0031102        3/2018
(Continued)

OTHER PUBLICATIONS

International Search Report for PCT/KR2020/007251 dated Sep. 3, 2020 (now published as WO 2020/251213) with English translation provided by WIPO.
(Continued)

*Primary Examiner* — Geepy Pe
*Assistant Examiner* — Daniel Tyler Reich
(74) *Attorney, Agent, or Firm* — Ladas & Parry, LLP

(57) ABSTRACT

The present disclosure provides a road impact simulating apparatus of a steer-by-wire system, the apparatus comprising: a Signal processor for determining a wheel speed difference value between wheels, and determining a lateral acceleration difference value between an estimated lateral acceleration and a sensed lateral acceleration of a vehicle; an Impact determinator for determining whether there is a road impact based on the wheel speed difference value; and a Torque calculator for determining a reaction force torque according to the road impact based on the lateral acceleration difference value if it is determined as the road impact.

16 Claims, 5 Drawing Sheets

(56) References Cited

U.S. PATENT DOCUMENTS

| | | | |
|---|---|---|---|
| 2003/0055546 A1* | 3/2003 | Demerly | B62D 6/008 |
| | | | 180/443 |
| 2003/0196848 A1 | 10/2003 | Zheng et al. | |
| 2005/0125153 A1* | 6/2005 | Matsumoto | B60T 8/17557 |
| | | | 701/41 |
| 2013/0304341 A1* | 11/2013 | Sakaguchi | B60W 30/1846 |
| | | | 701/69 |
| 2017/0253266 A1* | 9/2017 | Minamiguchi | B62D 6/008 |
| 2018/0265091 A1* | 9/2018 | Ienaga | B60K 1/02 |
| 2019/0066405 A1* | 2/2019 | Zhang | G07C 5/085 |

FOREIGN PATENT DOCUMENTS

| | | |
|---|---|---|
| KR | 10-2018-0065045 | 6/2018 |
| KR | 10-2018-0118962 | 11/2018 |

OTHER PUBLICATIONS

Written Opinion of the International Searching Authority for PCT/KR2020/007251 dated Sep. 3, 2020 (now published as WO 2020/251213) with English translation provided by Google Translate.

* cited by examiner

ROAD SURFACE IMPACT STIMULATION DEVICE OF STEER-BY-WIRE SYSTEM

CROSS-REFERENCE TO RELATED APPLICATIONS

This application is the national stage of International Patent Application No. PCT/KR2020/007251 filed on Jun. 4, 2020, which claims priority to and the benefit of Korean Patent Application Nos. 10-2019-0067882, filed on Jun. 10, 2019, the disclosures of which are incorporated herein by reference in their entireties.

BACKGROUND

1. Field of the Invention

The present disclosure relates to a steering apparatus, and more particularly, to a road impact simulating apparatus of a steer-by-wire system.

2. Discussion of Related Art

In general, a steering system refers to a system capable of changing a steering angle of a wheel based on a steering force (or rotational force) applied to a steering wheel by a driver of a vehicle. Recently, an electric power steer (EPS), that is, an electric power steering system, has been applied to a vehicle in order to reduce the steering force of the steering wheel to ensure the stability of the steering state.

Such an electric power steering system measures a speed state and a torque state of the vehicle through a vehicle speed sensor and a torque sensor mounted to the vehicle. In addition, the motor is driven according to the speed and torque state of the vehicle measured through the ECU (Electronic Control Unit) to provide a light and comfortable steering feeling to the driver of the vehicle during low-speed operation, and a heavy and safe steering feeling to the driver of the vehicle during high-speed operation. In addition, it is possible to provide an optimal steering state so that the driver of the vehicle can quickly steer in an emergency.

And, recently, research on a steering-by-wire-based vehicle steering apparatus is being actively conducted. In such a steer-by-wire-based vehicle steering apparatus, a steering column module connected to a steering wheel and a steering rack module connected to a wheel are mechanically separated from each other.

Meanwhile, in the case of a steering system in which the steering column module and the steering rack module are mechanically connected, disturbances flowing into the wheels are directly transmitted to the driver through the mechanical connection. This may cause discomfort to the driver, but it also has a net function of feeding back the current driving condition to the driver.

However, in the case of the steer-by-wire-based vehicle steering system, since the steering column module and the steering rack module are mechanically separated, disturbances flowing into the wheels are not transmitted to the driver.

In particular, when the vehicle passes through a speed bump or a pothole, it is a natural situation for the vehicle to shake left and right and the steering wheel to move due to the impact, however, in this case, the steer-by-wire-based vehicle steering apparatus has a problem in that the steering wheel does not move, so the behavior of the steering wheel and the vehicle is inconsistent, causing the driver to feel unnatural.

Therefore, a separate control technology for simulating the disturbance flowing into the wheel and transmitting it to the driver is required.

The above information disclosed in this Background section is only for enhancement of understanding of the background of the disclosure and it may therefore contain information that does not form the prior art that is already known to a person of ordinary skill in the art.

SUMMARY OF THE INVENTION

The present disclosure is directed to providing a steer-by-wire-based vehicle steering apparatus, more particularly a road impact simulating apparatus which can naturally simulate the movement of the steering wheel while the vehicle shakes left and right by an impact when the vehicle passes through a speed bump or a pothole.

The technical problems to be achieved in the present disclosure are not limited to the technical problems mentioned above, and other technical problems not mentioned will be clearly understood by those of ordinary skill in the art from the following description.

The present disclosure provides a road impact simulating apparatus of a steer-by-wire system, the apparatus comprising: a Signal processor for determining a wheel speed difference value between wheels, and determining a lateral acceleration difference value between an estimated lateral acceleration and a sensed lateral acceleration of a vehicle; an Impact determinator for determining whether there is a road impact based on the wheel speed difference value; and a Torque calculator for determining a reaction force torque according to the road impact based on the lateral acceleration difference value if it is determined as the road impact.

In addition, the road impact simulating apparatus of a steer-by-wire system according to an embodiment of the present disclosure may further include a Driver for applying the reaction force torque to a steering wheel.

In addition, the road impact simulating apparatus of a steer-by-wire system according to an embodiment of the present disclosure may further include a wheel speed sensor for detecting wheel speed of the wheel; a lateral acceleration sensor for detecting the sensed lateral acceleration; and a lateral acceleration calculation unit for determining the estimated lateral acceleration based on a steering angle and a vehicle speed.

If a first wheel speed difference value between the left and right front wheels is greater than or equal to a first reference value and a second wheel speed difference value between the left and right rear wheels is less than or equal to a second reference value, the Impact determinator may determine as the road impact.

In addition, if a first wheel speed difference value between the left and right front wheels is greater than or equal to a first reference value, a second wheel speed difference value between the left and right rear wheels is less than or equal to a second reference value, and a third wheel speed difference value between the left front and rear wheels or a fourth wheel speed difference value between the right front and rear wheels is greater than or equal to a third reference value, the Impact determinator may determine as the road impact.

In addition, if it is determined as the road impact and a steering torque of a vehicle driver is less than or equal to a fourth reference value or a rack force is less than or equal to a fifth reference value, the Impact determinator may output a road impact signal.

The Torque calculator may receive the road impact signal and determine an active count, which is an application time of the reaction force torque.

In addition, the Torque calculator may determine the active count based on a wheelbase and a vehicle speed of the vehicle.

In addition, the Torque calculator may set a reaction force torque map that defines the reaction force torque according to a difference in lateral acceleration for each vehicle speed, and determine the reaction force torque according to the lateral acceleration difference value and the vehicle speed using the reaction force torque map.

A steer-by-wire-based vehicle steering apparatus according to the present disclosure can naturally simulate the movement of the steering wheel while the vehicle shakes left and right by an impact when the vehicle passes through a speed bump or a pothole. And through this, it is possible to feed back the current driving road condition to the driver.

The effects of the present disclosure are not limited to those mentioned above, and other effects not mentioned will be clearly understood by those of ordinary skill in the art from the following description.

BRIEF DESCRIPTION OF THE DRAWINGS

The above and other objects, features, and advantages of the present disclosure will become more apparent to those of ordinary skill in the art by describing exemplary embodiments thereof in detail with reference to the accompanying drawings, in which.

DETAILED DESCRIPTION OF EXAMPLE EMBODIMENTS

Figure 1:
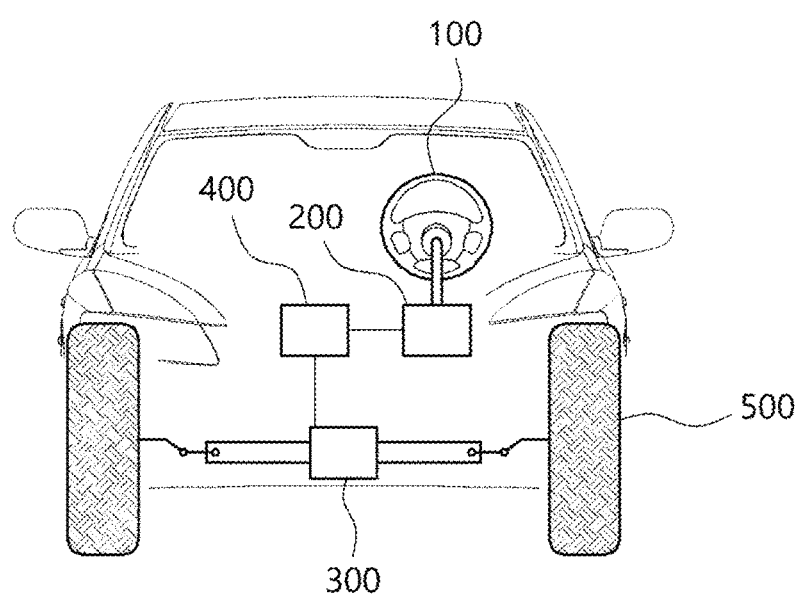
FIG. 1 is an overall configuration diagram for explaining a steer-by-wire based vehicle steering apparatus according to the present embodiment.

Hereinafter, exemplary embodiments of the present disclosure will be described in detail so that those of ordinary skill in the art can readily implement the present disclosure with reference to the accompanying drawings. The present disclosure may be embodied in many different forms and are not limited to the embodiments set forth herein. In the drawings, parts unrelated to the description are omitted for clarity. Throughout the specification, like reference numerals denote like elements.

It is understood that the terms "comprise" or "have" when used in this specification, are intended to specify the presence of stated features, integers, steps, operations, members, components and/or a combination thereof but not preclude the possibility of the presence or addition of one or more other features, integers, steps, operations, members, components, or a combination thereof.

FIG. 1 is an overall configuration diagram for explaining a steer-by-wire based vehicle steering apparatus according to the present embodiment.

Referring to FIG. 1, a steer-by-wire-based vehicle steering apparatus (hereinafter, referred to as a steer-by-wire system) according to the present embodiment may include a steering wheel 100 and a steering column module (SCM) 200, a steering rack module (SRM) 300, a control module 400 and a wheel 500.

The steering wheel 100 may be operated (i.e., rotated) by a driver's manipulation. That is, the steering wheel 100 is rotated by the driver's manipulation, and based on this, it may determine or change the driving direction of the vehicle (i.e., the driving direction of the wheel 500, etc.).

The steering column module 200 may be connected to the steering wheel 100. The steering column module 200 may include a steering shaft, a steering reaction force motor, and a plurality of sensors.

The steering shaft may be connected to the steering wheel 100, and may rotate corresponding to the rotating steering wheel 100 when the steering wheel 100 rotates.

The steering reaction force motor may be connected to the steering shaft. In addition, the steering reaction force motor may rotate in a direction opposite to the rotation direction of the steering wheel 100 to provide a steering reaction force to the steering wheel 100. Such a steering reaction force motor may make the driver feel an appropriate steering feeling.

The plurality of sensors may measure states of various components included in the steering column module 200, and may include at least one of a steering angle sensor, a torque sensor, and a steering angular velocity sensor. However, they are not limited thereto, and any sensor may be included as long as the states of various components included in the steering column module 200 can be measured.

Here, the steering angle sensor may measure the rotation angle of the steering wheel 100, that is, the steering angle of the steering wheel 100. In addition, the torque sensor may measure the torque generated in the steering shaft as the steering wheel 100 rotates. In addition, the steering angular velocity sensor may measure the rotation angular velocity of the steering wheel 100, that is, the steering angular velocity of the steering wheel 100.

The steering rack module 300 may be mechanically separated from the steering column module 200 described above. The steering column module 200 may include a driving motor, a pinion, a rack, and a plurality of sensors.

The driving motor may be driven by the driving current, and may generate a driving torque corresponding to the driving current. In addition, the driving motor may provide a steering force to the wheel 500 based on the generated driving torque.

The pinion may be connected to the driving motor. In addition, the pinion may rotate based on the driving torque generated by the driving motor. In addition, the rack may be connected to the pinion, and may perform a linear motion based on the rotational motion of the pinion. As such, the pinion and the rack may change the direction of the wheel 500 by providing a steering force to the wheel 500 based on the driving torque of the above-described driving motor.

The plurality of sensors may measure states of various components included in the steering rack module 300, and may include at least one of a rack position sensor, a rack displacement sensor, a pinion angle sensor, and a pinion angular velocity sensor. However, they are not limited thereto, and any sensor may be included as long as the states of various components included in the steering rack module 300 can be measured.

Here, the rack position sensor may measure the position of the rack, and the rack displacement sensor may measure the displacement of the rack. And, the pinion angle sensor may measure the rotation angle of the pinion, that is, the angle of the pinion, and the pinion angular velocity sensor may measure the rotation angular velocity of the pinion, that is, the angular velocity of the pinion.

The control module 400 may be connected to the steering column module 200 and the steering rack module 300 described above. In addition, the control module 400 may control the operation of the steering column module 200 and the steering rack module 300, that is, the operation of each component included in the steering column module 200 and the steering rack module 300.

That is, the control module 400 receives information from each of the components included in the steering column module 200 and the steering rack module 300. In addition, the control module may generate a control signal using the provided information, and control the operation of each component included in the steering column module 200 and the steering rack module 300 based on the generated control signal.

Also, the control module 400 may be connected to respective sensors mounted to the vehicle. In addition, the control module 400 may control the operation of each sensor mounted to the vehicle. That is, the control module 400 may control the operation of each sensor mounted to the vehicle and receive respective sensor information (e.g., vehicle speed information of the vehicle, etc.) from them. In addition, the control module 400 generates respective control signals based on the received respective sensor information. And, the control module may control the operation of each component included in the steering column module 200 and the steering rack module 300 by using each generated control signal.

Figure 2:
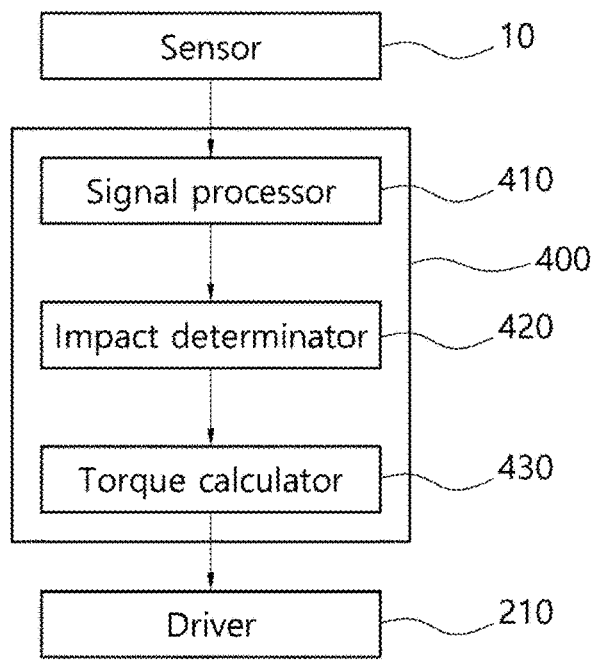
FIG. 2 is a block diagram of a road impact simulating apparatus of a steer-by-wire system of the present disclosure.
Figure 3:
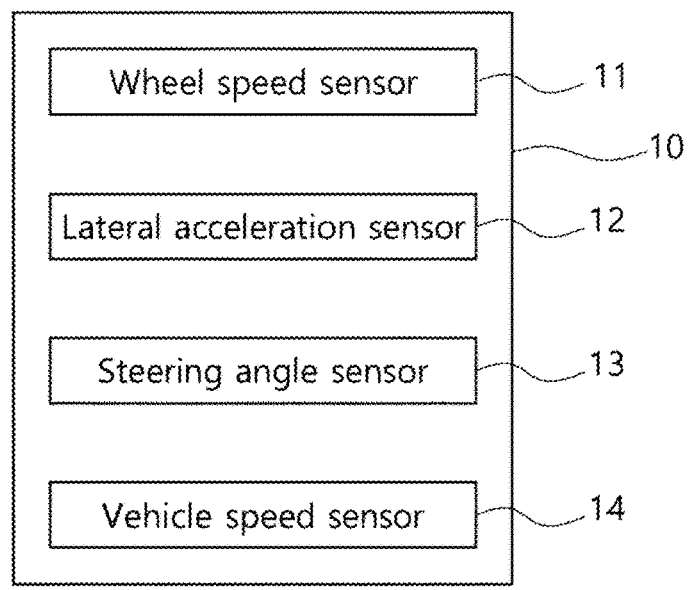
FIG. 3 is a detailed block diagram of a Sensor of FIG. 2.

FIG. 2 is a block diagram of a road impact simulating apparatus of a steer-by-wire system of the present disclosure, and FIG. 3 is a detailed block diagram of a Sensor of FIG. 2.

Referring to FIG. 2, the road impact simulating apparatus of the steer-by-wire system of the present disclosure may include a Sensor 10, a Signal processor 410, an Impact determinator 420, a Torque calculator 430 and a Driver 210. Here, the Sensor 10 includes a plurality of sensors provided in the steering column module 200 and the steering rack module 300 described above. In addition, the Signal processor 410, the Impact determinator 420, and the Torque calculator 430 may be provided in the aforementioned control module 400. In addition, the Driver 210 may include the aforementioned steering reaction force motor.

Referring to FIG. 3, the Sensor 10 may include a wheel speed sensor 11 for detecting the wheel speed of the wheel, a lateral acceleration sensor 12 for detecting a sensed lateral acceleration, a steering angle sensor 13 for detecting a steering angle of the steering wheel, and a vehicle speed sensor 14 for detecting a vehicle speed of a vehicle. Here, 4 wheel speed sensors 11 may be provided to sense the wheel speeds of the 4 wheels, that is, the left and right front wheels and the left and right rear wheels, respectively.

Meanwhile, the detected values of the wheel speed sensor 11 and the lateral acceleration sensor 12 may differ from actual values due to road impact. For example, the wheel speed sensor 11 may erroneously detect that the wheel speed is changed due to a road impact even though the actual wheel speed is not changed. In addition, the lateral acceleration sensor 12 may also erroneously detect that the lateral acceleration is changed due to a road impact even though the lateral acceleration is not changed.

As such, the road impact simulating apparatus of a steer-by-wire system according to an embodiment of the present disclosure determines whether or not a road impact occurs and determines the reaction torque, paying attention to the fact that the wheel speed sensor 11 and the lateral acceleration sensor 12 erroneously detect during a road impact.

The road impact simulating apparatus of a steer-by-wire system according to an embodiment of the present disclosure may further include a lateral acceleration calculation unit that determines an estimated lateral acceleration based on a steering angle and a vehicle speed. Here, the estimated lateral acceleration corresponds to the sensed lateral acceleration sensed by the lateral acceleration sensor 11, and may correspond to the actual lateral acceleration of the vehicle regardless of the road impact.

The Signal processor 410 determines a wheel speed difference between the wheels, and determines a lateral acceleration difference between the estimated lateral acceleration and the sensed lateral acceleration of the vehicle.

Figure 4:
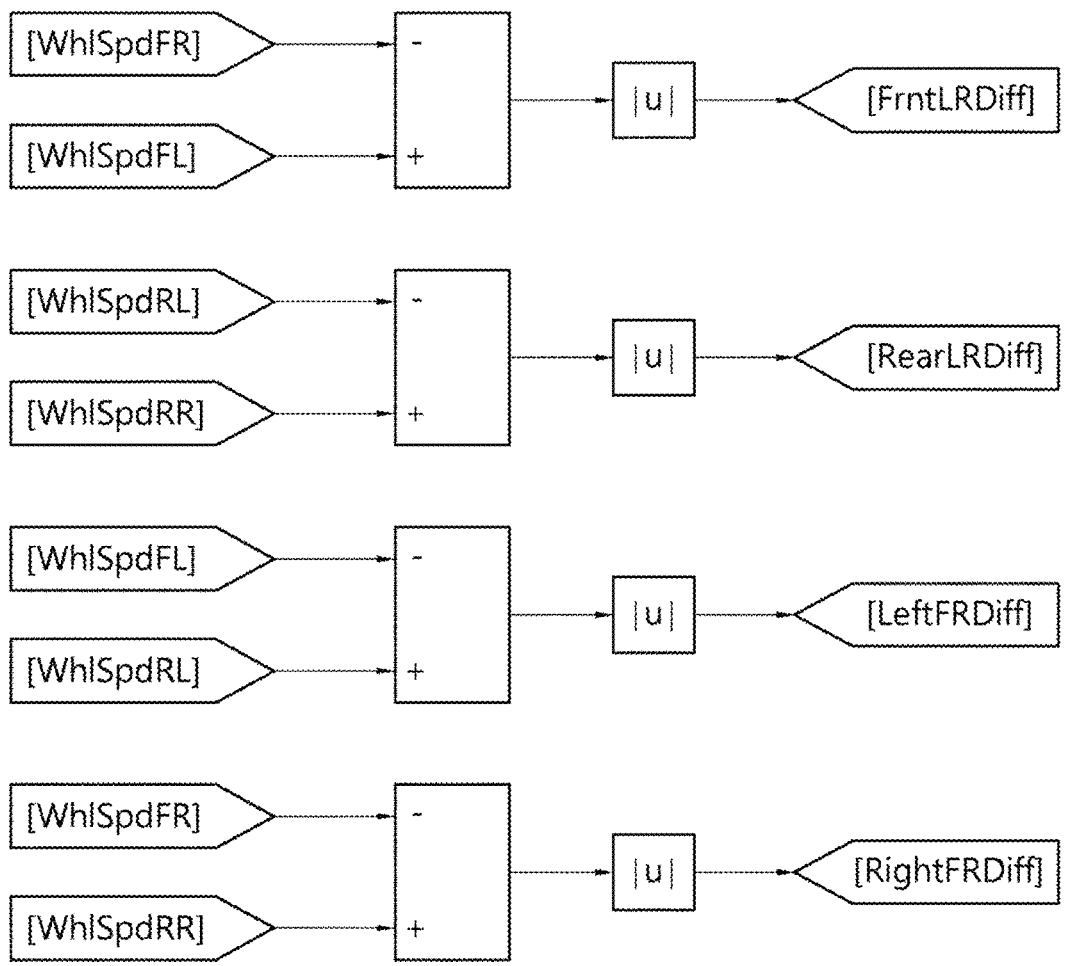
FIG. 4 is a block diagram for explaining a method in which a Signal processor of FIG. 2 determines a wheel speed difference between wheels.
Figure 5:
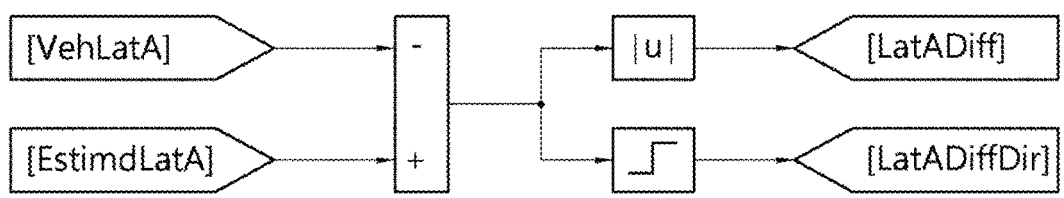
FIG. 5 is a diagram for explaining a method of determining, by the Signal processor of FIG. 2, a lateral acceleration difference between an estimated lateral acceleration and a sensed lateral acceleration of a vehicle.

FIG. 4 is a block diagram for explaining a method in which a Signal processor of FIG. 2 determines a wheel speed difference between wheels, and FIG. 5 is a diagram for explaining a method of determining, by the Signal processor of FIG. 2, a lateral acceleration difference between an estimated lateral acceleration and a sensed lateral acceleration of a vehicle.

Referring to FIG. 4, the Signal processor 410 receives 4 wheel speeds (WhlSpdFL, WhlSpdFR, WhlSpdRL, and WhlSpdRR) from the wheel speed sensor 11, respectively. Then, it determines a first wheel speed difference value FrntLRDiff, which is an absolute value of the difference between the left front wheel speed WhlSpdFL and the right front wheel speed WhlSpdFR, and determines a second wheel speed difference value RearLRDiff, which is an absolute value of the difference between the left rear wheel speed WhlSpdRL and the right rear wheel speed WhlSpdRR. Then, it determines a third wheel speed difference value LeftFRDiff, which is an absolute value of the difference between the left front wheel speed WhlSpdFL and the left rear wheel speed WhlSpdRL, and determines a fourth wheel speed difference value RightFRDiff, which is an absolute value of the difference between the right front wheel speed WhlSpdFR and the right rear wheel speed WhlSpdRR.

Referring to FIG. 5, the Signal processor 410 receives a sensed lateral acceleration VehLatA from the lateral acceleration sensor 12 and an estimated lateral acceleration EstimdLatA from the lateral acceleration calculation unit. Then, it determines a lateral acceleration difference value LatAdiff, which is an absolute value of the difference between the sensed lateral acceleration VehLatA and the estimated lateral acceleration EstimdLatA, and a phase LatAdiffDir.

The Impact determinator 420 receives the wheel speed difference value from the Signal processor 410 and determines whether there is a road impact based thereon.

Figure 6:
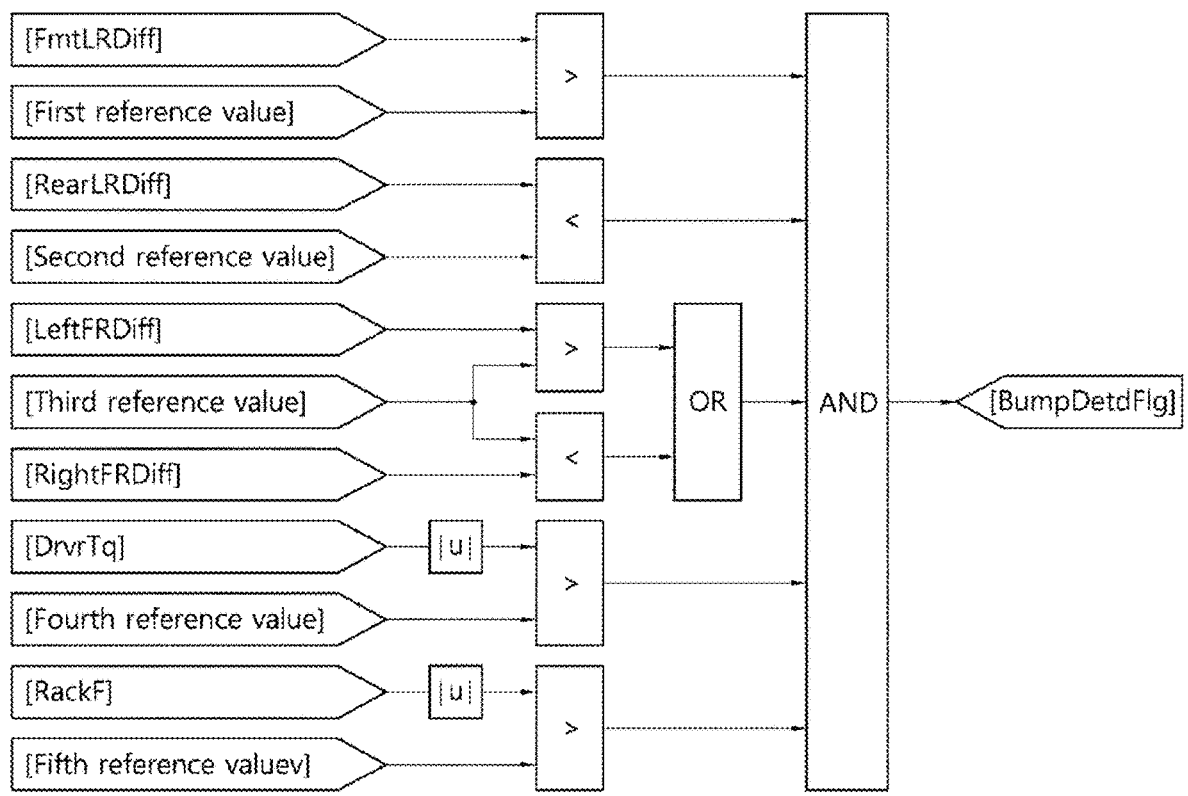
FIG. 6 is a block diagram for explaining a method in which an Impact determinator of FIG. 2 determines whether there is a road impact.

FIG. 6 is a block diagram for explaining a method in which an Impact determinator of FIG. 2 determines whether there is a road impact.

Referring to FIG. 6, if a first wheel speed difference value FrnLRDiff between the left and right front wheels is greater than or equal to a first reference value, a second wheel speed difference value RearLRDiff between the left and right rear wheels is less than or equal to a second reference value, and a third wheel speed difference value LeftFRDiff between the left front and rear wheels or a fourth wheel speed difference value RightFRDiff between the right front and rear wheels is greater than or equal to a third reference value, the Impact determinator 420 may determine as a road impact. Here, the first to third reference values may be preset and stored in the Impact determinator 420.

In general, when a vehicle is traveling on flat ground, the wheel speeds of the front and rear wheels detected by the wheel speed sensor 11 is almost the same, but when the vehicle passes through a speed bump or a pothole, the wheel speeds of the front wheel and the rear wheel detected by the wheel speed sensor 11 may be different due to an erroneous detection of the wheel speed sensor 11.

Specifically, looking at the process of the vehicle passing through the speed bump or pothole, the left and right front wheels pass first at a first time point, and the left and right rear wheels pass later at a second time point later than the first time point. Accordingly, at the first time point, the detected value of the wheel speed sensor 11 may differ from the actual value due to the road impact at the left and right front wheel speeds, but the left and right rear wheel speed has little difference between the detected value of the wheel speed sensor 11 and the actual value.

Accordingly, although little difference occurs between the left and right rear wheel speeds, differences may occur between the left and right front wheel speeds, between the left front and rear wheel speeds, and between the right front and rear wheel speeds. Such a difference becomes clear when only one of the left and right front wheels passes through a speed bump or a pothole. And, if these differences are equal to or more than the reference value, it may be determined as a road impact.

If it is determined as a road impact and the steering torque DrvrTq of the vehicle driver is less than or equal to a fourth reference value or the rack force RackF is less than or equal to a fifth reference value, the Impact determinator 420 may output a road impact signal, that is, a road impact flag 1. Here, the fourth and fifth reference values may be preset and stored in the Impact determinator 420.

Specifically, the fact that the steering torque DrvrTq or the rack force RackF exceeds the reference value means that the driver has a steering will, applying reaction force torque up to this case may cause discomfort to the driver. Accordingly, the Impact determinator 420 outputs the road impact signal only when there is no steering will with steering torque DrvrTq or rack force RackF below the reference value.

If it is determined as the road impact and the driver has no steering will, the Torque calculator 430 determines a reaction force torque according to the road impact based on the lateral acceleration difference value determined by the Signal processor 410. Here, the Torque calculator 430 increases the reaction force torque as the lateral acceleration difference value increases because the lateral acceleration difference value increases as the road impact increases.

Figure 7:
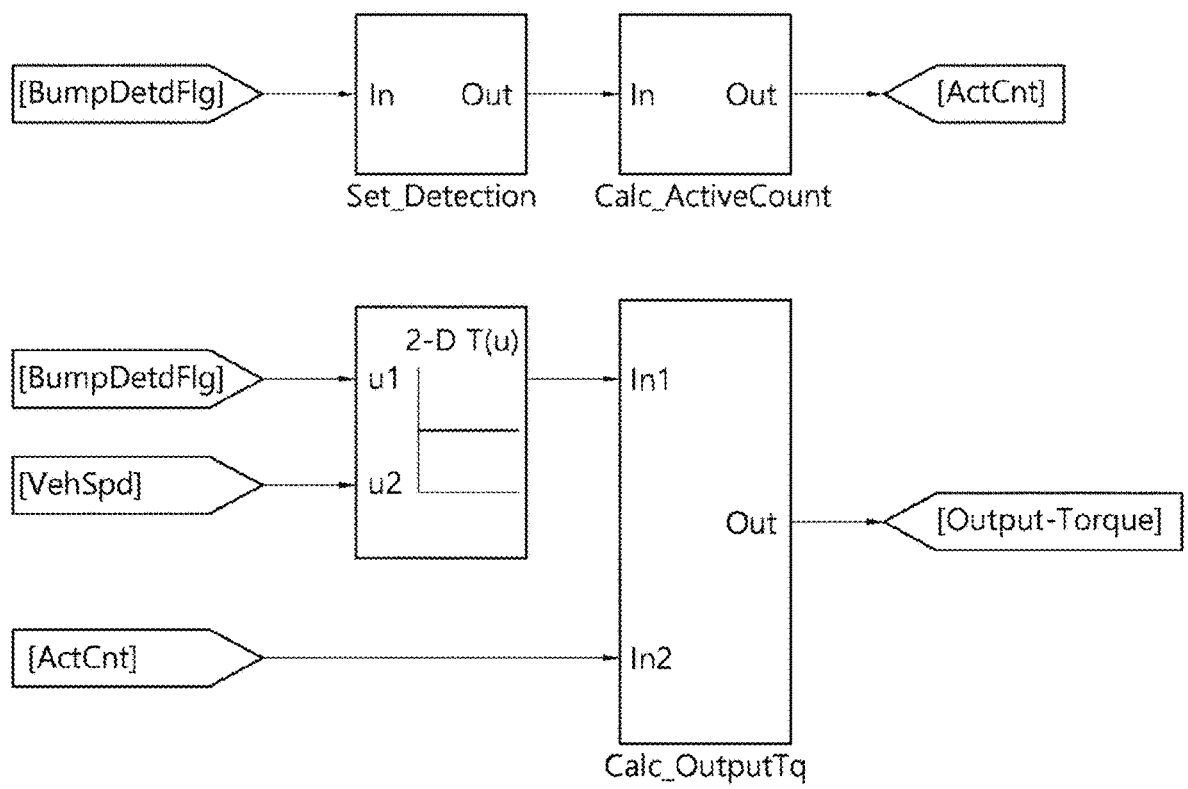
FIG. 7 is a block diagram for explaining a method in which a Torque calculator of FIG. 2 determines an active count and a reaction force torque.

FIG. 7 is a block diagram for explaining a method in which a Torque calculator of FIG. 2 determines an active count and a reaction force torque.

Referring to FIG. 7, the Torque calculator 430 receives the road impact signal and determines an active count ActCnt, which is an application time of the reaction force torque Output_Torque. Here, the active count ActCnt may be determined based on a wheelbase (distance between the front and rear wheels) and a vehicle speed of the vehicle.

Specifically, the reaction force torque Output_Torque is applied during the active count ActCnt, which is from the time when the road impact is generated to the end point, and the active count ActCnt may be determined as a value obtained by dividing the distance between the wheelbase of the vehicle by the vehicle speed.

The Torque calculator 130 may receive the lateral acceleration difference value LatADiff and the vehicle speed VehSpd, set a reaction force torque map that defines the reaction force torque according to a difference in lateral acceleration for each vehicle speed, and determine the reaction force torque Output_Torque according to the lateral acceleration difference value LatADiff and the vehicle speed VehSpd using the reaction force torque map. Here, the reaction force torque map may be set to increase the rate of increase of the reaction force torque according to the lateral acceleration difference as the vehicle speed increases.

The Driver 210 may receive the reaction force torque Output_Torque and the active count ActCnt from the Torque calculator 130 and apply the reaction force torque Output_Torque to the steering wheel 100 during the active count ActCnt.

As such, the road impact simulating apparatus of the steer-by-wire system according to an embodiment of the present disclosure can naturally simulate the movement of the steering wheel while the vehicle shakes left and right by an impact when the vehicle passes through a speed bump or a pothole, thereby feeding back the current driving road condition to the driver.

Although exemplary embodiments of the present disclosure have been described above, the spirit of the present disclosure is not limited to the embodiments set forth herein. Those of ordinary skill in the art who understand the spirit of the present disclosure may easily propose other embodiments through supplement, change, removal, addition, etc. of elements within the same spirit, but the embodiments will be also within the scope of the present disclosure.

The road impact simulating apparatus according to the present disclosure may be used in a steer-by-wire system provided in a vehicle.

What is claimed is:

1. A road impact simulating apparatus of a steer-by-wire system, the apparatus comprising a controller configured to:
   determine a wheel speed difference value between wheels, and determine a lateral acceleration difference value between an estimated lateral acceleration of a vehicle and a sensed lateral acceleration of the vehicle;
   determine whether there is a road impact based on the wheel speed difference value between the wheels; and
   determine a reaction force torque according to the road impact based on the lateral acceleration difference value if it is determined as the road impact,
   wherein the controller is configured to, if a first wheel speed difference value between the left and right front wheels is greater than or equal to a first reference value, a second wheel speed difference value between the left and right rear wheels is less than or equal to a second reference value, and a third wheel speed difference value between the left front and rear wheels or a fourth wheel speed difference value between the right front and rear wheels is greater than or equal to a third reference value, determine that there is the road impact.

2. The road impact simulating apparatus of the steer-by-wire system of claim 1, further comprising a driver configured to apply the reaction force torque to a steering wheel.

3. The road impact simulating apparatus of the steer-by-wire system of claim 1, further comprising:
   a wheel speed sensor for detecting wheel speed of the wheel; and
   a lateral acceleration sensor for detecting the sensed lateral acceleration,
   wherein the controller is configured to determine the estimated lateral acceleration based on a steering angle and a vehicle speed.

4. The road impact simulating apparatus of the steer-by-wire system of claim 1, wherein the controller is configured to, if a first wheel speed difference value between the left and right front wheels is greater than or equal to a first reference value and a second wheel speed difference value between the left and right rear wheels is less than or equal to a second reference value, determine that there is the road impact.

5. The road impact simulating apparatus of the steer-by-wire system of claim 4, wherein the controller is configured to, if the controller determines that there is the road impact and a steering torque of a vehicle driver is less than or equal to a fourth reference value or a rack force is less than or equal to a fifth reference value, output a road impact signal.

6. The road impact simulating apparatus of the steer-by-wire system of claim 5, wherein the controller is configured to receive the road impact signal and determine an active count, which is an application time of the reaction force torque.

7. The road impact simulating apparatus of the steer-by-wire system of claim 6, wherein the controller is configured to determine the active count based on a wheelbase and a vehicle speed of the vehicle.

8. The road impact simulating apparatus of the steer-by-wire system of claim 1, wherein the controller is configured to set a reaction force torque map that defines the reaction force torque according to a difference in lateral acceleration for each vehicle speed, and determine the reaction force torque according to the lateral acceleration difference value and the vehicle speed using the reaction force torque map.

9. A road impact simulating method of a steer-by-wire system, the method comprising:
   determining a wheel speed difference value between wheels, and determining a lateral acceleration difference value between an estimated lateral acceleration of a vehicle and a sensed lateral acceleration of the vehicle;
   determining whether there is a road impact based on the wheel speed difference value;
   determining a reaction force torque according to the road impact based on the lateral acceleration difference value if it is determined that there is the road impact; and
   if a first wheel speed difference value between the left and right front wheels is greater than or equal to a first reference value, a second wheel speed difference value between the left and right rear wheels is less than or equal to a second reference value, and a third wheel speed difference value between the left front and rear wheels or a fourth wheel speed difference value between the right front and rear wheels is greater than or equal to a third reference value, determining that there is the road impact.

10. The road impact simulating method of the steer-by-wire system of claim 9, further comprising applying the reaction force torque to a steering wheel.

11. The road impact simulating method of the steer-by-wire system of claim 10, further comprising:
   detecting wheel speed of the wheel;
   detecting the sensed lateral acceleration; and
   determining the estimated lateral acceleration based on a steering angle and a vehicle speed.

12. The road impact simulating method of the steer-by-wire system of claim 9, further comprising, if a first wheel speed difference value between the left and right front wheels is greater than or equal to a first reference value and a second wheel speed difference value between the left and right rear wheels is less than or equal to a second reference value, determining that there is the road impact.

13. The road impact simulating method of the steer-by-wire system of claim 12, wherein further comprising, if it is determined that there is the road impact and a steering torque of a vehicle driver is less than or equal to a fourth reference value or a rack force is less than or equal to a fifth reference value, outputting a road impact signal.

14. The road impact simulating method of the steer-by-wire system of claim 13, further comprising receiving the road impact, signal and determine an active count, which is an application time of the reaction force torque.

15. The road impact simulating method of the steer-by-wire system of claim 14, further comprising determining the active count based on a wheelbase and a vehicle speed of the vehicle.

16. The road impact simulating method of the steer-by-wire system of claim 9, further comprising setting a reaction force torque map that defines the reaction force torque according to a difference in lateral acceleration for each vehicle speed, and determining the reaction force torque according to the lateral acceleration difference value and the vehicle speed using the reaction force torque map.

* * * * *